April 16, 1957
R. O. GIRTON
2,788,985
TURN BANKING SUSPENSION FOR VEHICLES
Filed Aug. 23, 1954
3 Sheets-Sheet 2
Fig. 2.
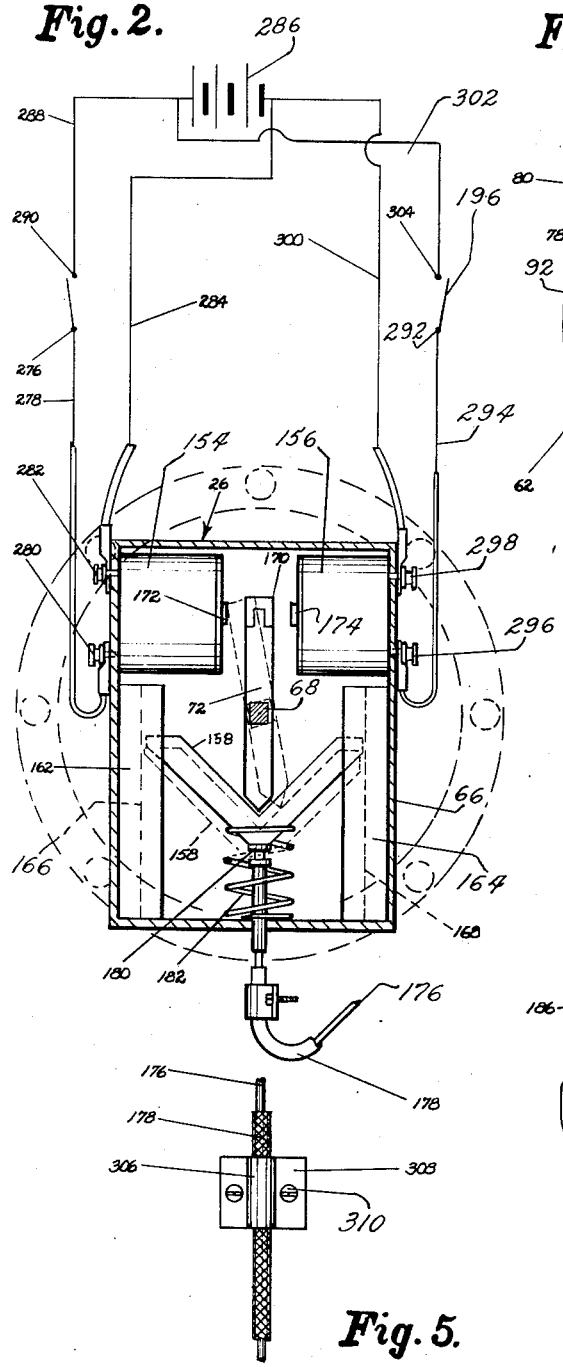
Fig. 3.
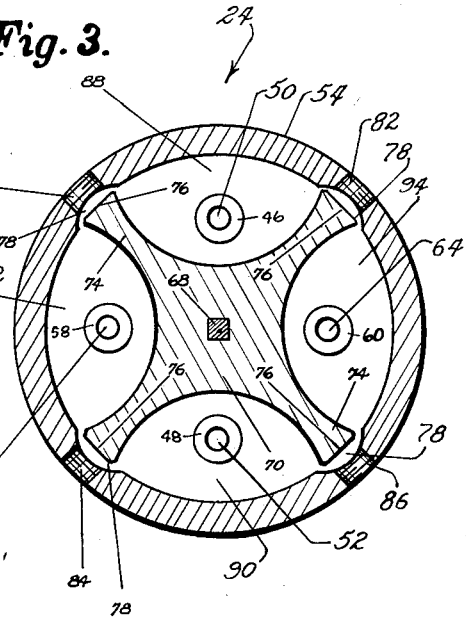
Fig. 4.
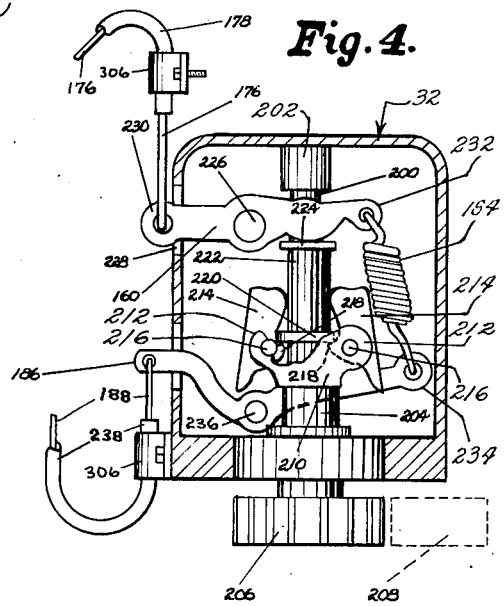
Fig. 5.
INVENTOR.
Ray O. Girton
BY Arthur H. Sturges.
Attorney April 16, 1957 R. O. GIRTON 2,788,985
TURN BANKING SUSPENSION FOR VEHICLES
Filed Aug. 23, 1954 3 Sheets-Sheet 3

INVENTOR.
Ray O. Girton
BY Arthur H. Sturges.
Attorney

United States Patent Office 2,788,985
Patented Apr. 16, 1957

2,788,985

TURN BANKING SUSPENSION FOR VEHICLES

Ray O. Girton, Salt Lake City, Utah

Application August 23, 1954, Serial No. 451,441

5 Claims. (Cl. 280—112)

This invention relates to devices for automatically banking a motor vehicle before and or as the vehicle negotiates a turn particularizing the rate of speed and the radius with which the turn is being negotiated wherein the center of gravity is restrained from moving away from the line of travel of the vehicle by the body of the vehicle being tilted away from the turn by a force resulting from the momentum of the weight of the body having a tendency to travel straight ahead, this being accomplished in particular by telescoping hydraulic cylinders positioned in the chassis between the axles and the frame of a vehicle with means controlled by the speed of the vehicle and the radius of the turn being negotiated by extending the cylinders on one side of the vehicle and contracting the cylinders on the opposite side whereby the cylinders bank the body of the vehicle in accordance with the turn being made and the speed of the vehicle.

The purpose of this invention is to provide means incorporated in the structure of or added to the structure of a motor vehicle making it adaptable for negotiating turns at greater speeds with greater safety and less danger of over turning.

Numerous accidents occur daily as a result of vehicles endeavoring to negotiate turns at high speed and after a vehicle starts to turn and momentum results in a bad tilt to the outside of the turn it is substantially impossible for an operator to maintain any great degree of control in bringing the vehicle back to a traveling position with regard to the radius of the turn.

Another purpose of this invention is to provide a means for keeping the body of the car in a level position while traveling on a high crowned road or in a strong cross wind.

The object of this invention is, therefore, to provide means adapted to be controlled by the speed and turning action of a traveling vehicle for banking the vehicle or causing the body of the vehicle to lean toward the inside while making a turn.

Another object of the invention is to provide means for automatically banking or tilting the body of a vehicle toward the inside in making a turn in which the apparatus is adapted to be installed in vehicles now in use.

Another important object of the invention is to provide banking means adapted to be installed in motor vehicles to facilitate negotiating turns in highways in which the degree of tilt of the body of the vehicle is in proportion to the speed of the vehicle and radius of the turn.

A further object of the invention is to provide telescoping hydraulic cylinders adapted to be installed between the axles and chassis of a motor vehicle with means for supplying fluid under pressure to the cylinders for tilting or banking a vehicle in negotiating a turn in a highway in which pistons in the cylinders are provided with minute orifices so that the cylinders also provide shock absorbers for the vehicle.

A still further object of the invention is to provide a turn banking suspension for motor vehicles in which the device is adapted to be used on pleasure cars, trucks, and substantially all types of vehicles.

And a still further object of the invention is to provide apparatus adapted to be installed on motor vehicles for causing vehicles to lean toward the inside of a curve to prevent vehicles turning over in which the apparatus is of a simple and economical construction.

With these and other objects and advantages in view the invention embodies telescoping hydraulic cylinders mounted between the chassis and axles and adjacent the wheels of a vehicle, a pump adapted to be driven by the engine of the vehicle, a valve connected to the pump for controlling the supply and return of fluid between the pump and cylinders, a valve controller in combination with the valve to regulate the valve to compensate for variations in speed and also to correspond with the radius of a curve, a governor for actuating the speed regulating means, and means actuated by the steering wheel of the vehicle also adapted to actuate the valve control means.

Other features and advantages of the invention will appear from the following description taken in connection with the drawings, wherein:

Figure 1 is a diagrammatic view illustrating the general arrangement of the vehicle banking apparatus showing the relative positions of the four telescoping cylinders, pump, valve, valve controller and velocity turn compensator or governor, with typical connections between the parts and with conventional parts of the vehicle, such as the engine, steering wheel and belt connection to the pump, shown in dotted lines.

Figure 2 is a cross section through the valve controller, taken on line 2—2 of Figure 1, the parts being shown on an enlarged scale and a typical wiring diagram being shown in combination therewith.

Figure 3 is a cross section through the hydraulic distributing valve taken on line 3—3 of Figure 1, the parts also being shown on an enlarged scale.

Figure 4 is a longitudinal section through a velocity compensator or governor, the device being shown on the corner of the engine in Figure 1, and the parts being shown on an enlarged scale.

Figure 5 is a detail showing a typical clamp for attaching sheaths of control wires used in the apparatus to different points of the chassis.

Figure 1:
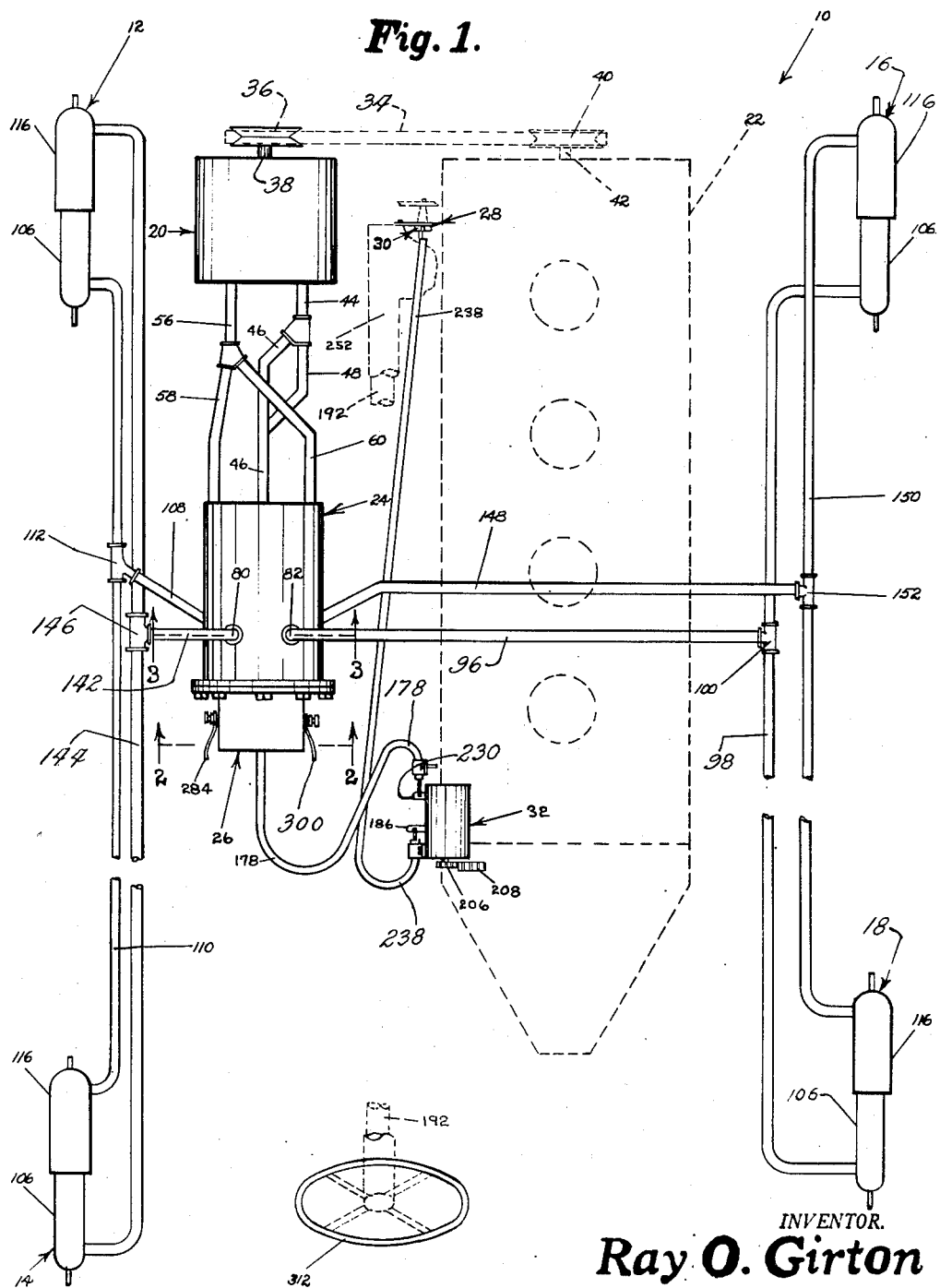
Figure 6:
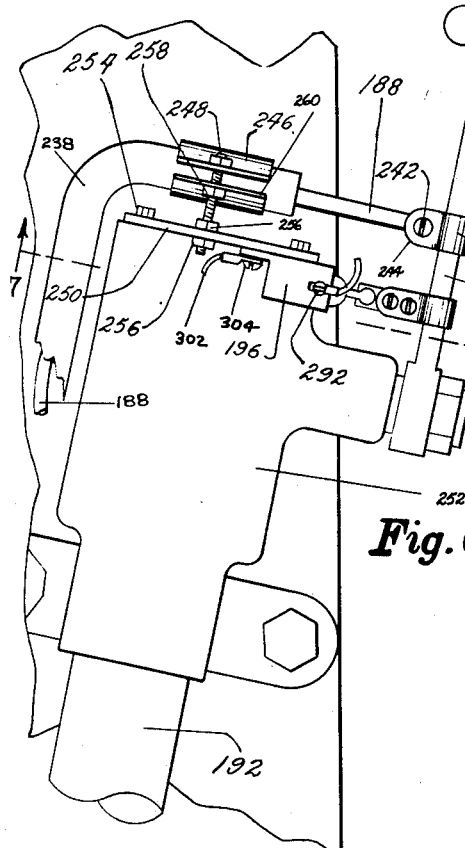
Figure 6 is a detail taken substantially on line 6—6 of Figure 7, showing the connections of the radius of turn apparatus for modifying the action of the velocity compensator.

While one embodiment of the invention is illustrated in the above referred to drawings, it is to be understood that they are merely for the purpose of illustration and that various changes in construction may be resorted to in the course of manufacture in order that the invention may be ultilized to the best advantage according to circumstances which may arise, without in any way departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numerals 12, 14, 16, and 18 telescoping hydraulic cylinders mounted between the axles and chassis and positioned inside of the wheels of the vehicle, numeral 20 a pump actuated by the engine 22 of the vehicle, numeral 24 a distributing valve, numeral 26 a valve controller, numerals 28 and 30 toggle switch assemblies for exciting electromagnets of the valve controller and adapted to be actuated by turning movements of the steering wheel of a vehicle in negotiating a turn, and numeral 32 a velocity compensator or governor by which fluid is supplied to the cylinders on the side of the vehicle on the outside of the curve in proportion to the speed of the vehicle.

Fluid under pressure is supplied to the cylinders by the pump 20 through the valve 24, and the pump is driven by the engine with a belt 34 which is trained over a pulley 36 on a shaft 38 of the pump and a pulley 40 on a shaft 42 of the engine. The shaft 42 is also provided with means for driving the generator and water pump of the engine, as is conventional.

The discharge connection of the pump, which is indicated by the numeral 44 is divided into two branches 46 and 48, and the branches 46 and 48 are connected to openings 50 and 52, respectively, in the end of the valve housing 54. The suction connection 56 is also divided into branches 58 and 60 and these branches are connected to openings 62 and 64, respectively, in the end of the housing 54.

The housing 54 of the valve 24 and a housing 66 of the valve controller 26 are integrally connected and a shaft 68, which is shown as being square in cross section, is rotatably mounted in the housings with a core 70 on a square intermediate portion in the housing 54, and an arm 72 on a square intermediate portion in the housing 66. The core 70 is provided with radially disposed arms 74 having enlarged outer ends 76 which, with the valve in the free position, register with recesses 78 at the inner ends of outlet openings 80, 82, 84 and 86. Upon rotation of the core 70 in one direction fluid under pressure is supplied to the lower ends of the cylinders on one side of the vehicle to extend the cylinders and fluid is withdrawn from the upper ends of the cylinders. At the same time fluid is supplied under pressure to the upper ends of the cylinders on the opposite side of the vehicle to contract these cylinders, and fluid is withdrawn from the lower ends of these cylinders.

The pump supplies fluid under pressure to pressure chambers 88 and 90 through the connections 46 and 48 and openings 50 and 52, and draws fluid from suction chambers 92 and 94 through openings 62 and 64 and connections 58 and 60. The opening 82 is connected by a tube 96 to a tube 98 through a fitting 100, and the tube 98 is connected to openings 102 in the lower ends 104 of lower cylinders 106 of the cylinders 16 and 18, whereby upon rotation of the core 70 in a clockwise direction fluid passes from the pressure chamber 88 to the lower ends of the cylinders 16 and 18.

The opening 84, which is positioned opposite to the opening 82, is connected by a tube 108 to a tube 110 through a fitting 112, and the ends of the tube 110 are connected to the upper ends 114 of upper cylinders 116 of the cylinders 12 and 14, whereby the cylinders 12 and 14 are contracted as the cylinders 16 and 18 are extended.

Figure 8:
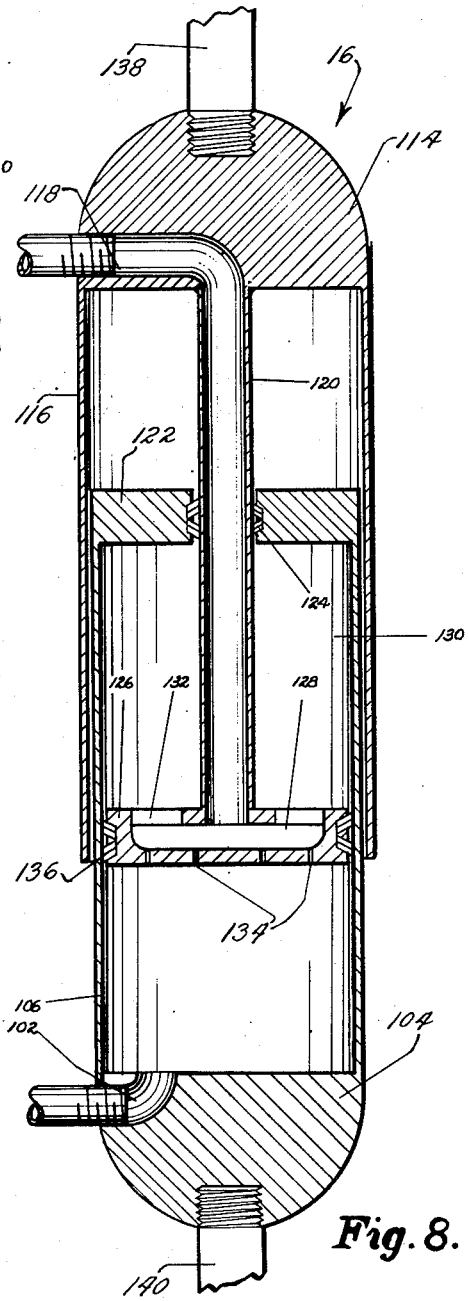
Figure 8 is a longitudinal section through one of the telescoping hydraulic cylinders.

The cylinders are similar and the same reference characters are used to designate the same parts of each. The upper ends 114 of the upper cylinders 116 are provided with openings 118 to which the supply and return tubes are connected, and, as shown in Figure 8, a tube 120 extends from the opening 118 downwardly through a head 122 having a packing ring 124 therein into the cylinder 106 in the upper end of which the head is positioned and the lower end of the tube 120 is provided with a piston 126. The piston is provided with a cavity 128 which opens into an area 130 between the piston and head 122 through openings 132, and the lower side of the piston is provided with minute orifices 134 which permit fluid to bleed through the piston so that the cylinders provide shock absorbers. The piston is also provided with a packing ring 136. The tube 120 is stationary with the upper cylinder and the upper cylinder is fixedly mounted on the chassis of the vehicle with a stud 138 that is threaded in the upper end. A similar stud 140 is provided in the lower end of the lower cylinder, and the lower cylinder is adapted to be connected by the stud to an axle or the like.

The opening 80 is connected by a tube 142 to a tube 144 through a fitting 146 and the ends of the tube 144 are connected to the lower ends of the cylinders 12 and 14. The opening 86 is connected by a tube 148 to a tube 150 through a fitting 152 and the ends of the tube 150 are connected to the upper ends of the cylinders 16 and 18.

The shaft 68 and core 70 are rotated by the arm 72, the upper end of which is positioned between electromagnets 154 and 156, and the movement of the arm 72 is controlled by a V-shaped traveler 158 which is actuated by an arm 160 in the velocity compensator 32, and which is retained in position by tracks or guides 162 and 164, as shown in Figure 2. The tracks are provided with slots 166 and 168 into which the ends of arms of the traveler extend, and the lower end of the arm 72 is V-shaped to correspond with the upper surface of the traveler. The upper end of the arm 72 carries a block 170 of material having magnetic attraction, and the block 170 is positioned to be influenced by poles 172 and 174 of the electro-magnets 154 and 156, respectively.

The traveler 158 is connected to the arm 160 in the velocity compensator with a wire 176, such as choke wire, and the wire 176 is covered with a braided sheath or tube 178. The wire is connected to the traveler with a swivel coupling 180 and the traveler is urged upwardly against the lower end of the arm 72 by a spring 182.

The position of the traveler 158 is influenced directly by the speed of the vehicle through the wire 176 and the arm 160 in the governor portion of the velocity compensator, and the movement of the arm 160 is also influenced by the radius of the turn the vehicle is negotiating through a spring 184, a lever 186 and a wire 188, also similar to choke wire, and which is connected to the radius rod arm 190 on the lower end of the steering wheel post 192 of the vehicle. The arm 190 also actuates toggle switches 194 and 196 which control circuits to the electro-magnets 154 and 156, whereby a pull is not exerted on the upper end of the arm 72 until the vehicle starts to turn.

The velocity compensator 32 includes governor elements comprising a shaft 200 rotatably mounted in bearings 202 and 204 in the housing, and the rear end of the shaft, which extends from the housing, is provided with a toothed wheel 206 that is positioned to engage a flywheel 208 of the engine of the vehicle. A collar 210, which is keyed to the shaft, is provided with ears 212 in which weight arms 214 are pivotally mounted with pins 216. The inner surfaces of the arms 214 are provided with fingers 218 that are positioned to engage a collar 220 of a sleeve 222 which is slidably mounted on the shaft, and a collar 224 on the opposite end of the sleeve is adapted to engage the arm 160 which is pivotally mounted in the housing by a pin 226. One end of the arm 160 extends through a slot 228 in the housing and the extended end is provided with an eye 230 through which the wire 176 is connected to the arm. The opposite end of the arm is provided with an eye 232 through which the spring 184 is connected to the arm, and the opposite end of the spring is connected to an eye 234 in the end of the lever 186. The lever is pivotally mounted in the housing with a pin 236 and it will be noted that as the arm 190 swings laterally with the movement of the steering wheel, the wire 188 is actuated through the sheath 238, moving the extended end of the lever 186 rearwardly whereby the opposite end draws the inner end of the arm 160 through the spring 184. By this means the degree of a turn negotiated by the vehicle is transmitted to the controlling V-shaped traveler 158.

The end of the wire 188 opposite to the end connected to the lever 186 is connected by a clamp 240, similar to a hose clamp and having a bolt 242 extended through flanges 244, to the arm 190, and, to permit the wire to follow the arm 190, the end of the sheath through which the wire extends is secured in a pivotally mounted clamp 246. The clamp 246 is mounted by a bolt 248 in a mounting plate 250 that is secured to the end of the gear housing 252, at the lower end of the steering wheel post, by bolts 254. The bolt 248 is provided with nuts 256 positioned on opposite sides of the plate 250, and also with a nut 258 which secures the bolt in flanges 260 of the clamp 246.

Figure 7:
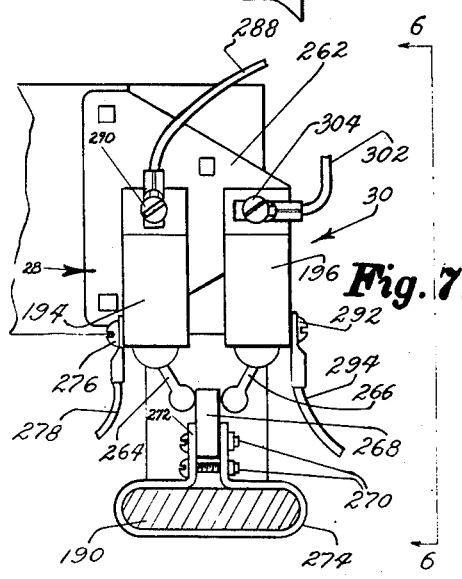
Figure 7 is a detail taken on line 7—7 of Figure 6, illustrating the electro-magnet controls of the radius of turn apparatus.

The mounting plate 250 also provides supporting means for a base plate 262 on which the toggle switches 194 and 196 are mounted, and, as illustrated in Figure 7, the switches 194 and 196 are positioned whereby fingers 264 and 266, which extend from the switches are engaged by a stiff rubber element 268 which is secured by bolts 270 between flanges 272 of a clamp 274 on the arm 190. The parts are adjusted whereby the fingers 264 and 266 pass over the center before snapping the switches so that slight movements of the steering wheel do not operate the device.

One terminal 276 of the switch 194 is connected by a wire 278 to a terminal 280 of the electro-magnet 154 and the other terminal 282 of the electro-magnet is connected by a wire 284 to one terminal of a battery 286, the opposite terminal of the battery being connected by a wire 288 to the other terminal 290 of the switch. In the same manner one terminal 292 of the switch 196 is connected by a wire 294 to a terminal 296 of the electro-magnet 156 and the other terminal of the electro-magnet, which is indicated by the numeral 298 is connected by a wire 300 to one terminal of the battery. The opposite terminal of the battery is connected by a wire 302 to the other terminal 304 of the switch 196.

The wires 176 and 188 are secured to parts of the chassis of the vehicle with clamps 306 which, as illustrated in Figure 5, extend over the covering elements of the wires. Flanges 308 of the clamps are provided with openings 310 through which bolts or screws may be extended to retain the parts in position on the chassis.

With the parts assembled and incorporated in the chassis of a motor vehicle as disclosed and described it will be understood that in negotiating a turn in a roadway turning the steering wheel, which is indicated by the numeral 312, actuates the arm 190 which closes one of the switches 194 or 196, whereby one of the solenoids 154 or 156 draws the upper end of the arm 72, as suggested in the dotted lines in Figure 2, so that the shaft 68 is turned clockwise or counter-clockwise and the valve assembly 24 admits fluid under pressure to the lower ends of the cylinders on one side of the vehicle to extend the cylinders and to the upper ends of the cylinders on the opposite side to contract the cylinders. At the same time the fluid is drawn from the ends of the cylinders opposite to the ends to which the pressure is supplied. The distance the arm 72 moves depends upon the position of the traveler 158, and the position of the traveler is controlled by the speed of the vehicle in combination with the radius of the turn, the traveler being actuated by the governor arm 160 through the wire 176, and the movement of the arm 160 being controlled by the tension of the spring 184, which is adjusted by the movement of the arm 190, to which the spring is connected by the wire 188 and lever 186.

The improved vehicle banking device of this invention, therefore, banks the vehicle in proportion to the radius of the curve and speed of the vehicle, and with the parts adjustable the elements are adapted to be set to bank the vehicle to any angle desired.

With the small orifices in the pistons of the cylinders the cylinders are adapted to function as shock absorbers, so that they may be positioned where conventional shock absorbers are mounted. The pump which supplies the fluid under pressure is driven by the engine of the vehicle, and the solenoids or electromagnets may be connected to the battery of the vehicle or to a suitable source of electric current.

From the foregoing specification, it will become apparent that the invention disclosed will adequately accomplish the functions for which it has been designed and in an economical manner and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description is connection with the drawings. Therefore, a more lengthy description is regarded as unnecessary.

Changes in shape, and rearrangement of details and parts, such as come within the purview of the invention claimed may be resorted to, in actual practice, if desired.

Having now described the invention that which is claimed to be new and desired to be procured by Letters Patent, is:

1. A turn banking suspension for motor vehicles comprising telescoping hydraulic cylinders mounted at the four corners of a vehicle and positioned with the upper ends connected to the chassis of the vehicle and the lower ends connected to the axles, a pump adapted to be actuated by a moving part of the vehicle upon which the device is installed, a distributing valve, connections extended from the distributing valve to upper and lower ends of the cylinders, a shaft extended from the distributing valve, an arm carried by the shaft, solenoids at one end of the arm and positioned on opposite sides thereof, means for energizing the solenoids to influence the arm to actuate the distributing valve, a V-shaped traveler positioned to be engaged by an end of the arm, the movement of said traveler being controlled by the speed of the vehicle and radius of a turn the vehicle is negotiating whereby the movement of the arm is limited so that the arm positions the distributing valve for supplying fluid under pressure to the lower ends of the cylinders on the side of the vehicle on the outside of the turn to extend the cylinders and to the upper ends of the cylinders on the side of the vehicle on the inside of the turn to contract said cylinders as the vehicle negotiates a turn, said means drawing fluid from the ends of the cylinders opposite to the ends to which the fluid under pressure is supplied.

2. In a motor vehicle banking device, the combination which comprises telescoping hydraulic cylinders adapted to be positioned at the four corners of a vehicle with the upper ends connected to the chassis of the vehicle and the lower ends connected to the axles, a pump adapted to be actuated by the engine of the vehicle, means for connecting the suction and discharge of the pump to the ends of the cylinders, a valve assembly in the means for connecting the pump to the cylinders, an arm having a V-shaped lower end carried by the valve assembly, a V-shaped traveler positioned to coact with the lower end of the arm, a governor controlled by the speed of a vehicle and the radius of a turn the vehicle is negotiating for actuating the traveler to adjust the valve assembly to supply fluid to one of the ends of the cylinders and withdraw fluid from the opposite ends of the cylinders whereby the cylinders on the side of the vehicle on the outside of the turn are extended and the cylinders on the side of the vehicle on the inside of the turn are contracted.

3. In a motor vehicle banking device, the combination which comprises telescoping hydraulic cylinders adapted to be positioned at the four corners of a vehicle with the upper ends connected to the chassis and the lower ends connected to the axles, a pump adapted to be actuated by the engine of the vehicle, means for connecting the suction and discharge of the pump to the upper and lower ends of the cylinders, a valve assembly in the means for connecting the pump to the cylinders, a solenoid actuated control for said valve assembly an arm carried by the valve assembly, a V-shaped traveler into which one end of the arm extends, a governor for controlling the position of the traveler in relation to the speed of the vehicle, means for controlling the operation of the governor in relation to the radius of a turn made by the vehicle whereby the valve assembly is actuated so that fluid under pressure is supplied to the lower ends of the cylinders on the side of a vehicle on the outside of a turn to extend said cylinders and to the upper ends of cylinders on the side of the vehicle on the inside of the turn to contract said cylinders as the vehicle negotiates a turn, and switches actuated by an arm on the steering wheel post of the vehicle for closing circuits to the solenoids depending upon the direction of turn, said arm, traveler, and governor providing a velocity compensator whereby fluid is supplied to the cylinders in proportion to the speed of the vehicle.

4. In a motor vehicle banking device, the combination which comprises telescoping hydraulic cylinders adapted to be mounted at the four corners of a vehicle and positioned with the upper ends connected to the chassis of the vehicle and the lower ends connected to axles of the wheels of the vehicle, a pump adapted to be mounted on a chassis of a vehicle and adapted to be actuated by the engine of the vehicle, tubes connecting the suction and discharge of the pump to upper and lower ends of the cylinders, a valve assembly through which the tubes are connected, a valve actuator positioned on one end of the valve assembly, an arm positioned in the valve actuator and operatively connected to the valve assembly, solenoids in said actuator for moving said arm, switches adapted to be closed by an arm actuated by the steering wheel of the vehicle for closing circuits to the solenoids in accordance with the direction of turn of the vehicle, a governor adapted to be mounted on the chassis and adapted to be rotated by a rotating part of the vehicle, a traveler positioned in the valve actuator and adapted to control the movement of said arm therein, means for actuating the traveler by the governor, and means also actuated by the arm of the steering wheel for controlling the movement of the governor.

5. In a motor vehicle banking device, the combination which comprises telescoping hydraulic cylinders adapted to be mounted at the four corners of a vehicle with the upper ends connected to the chassis and the lower ends connected to axles of the wheels, a pump adapted to be mounted on the chassis of the vehicle and actuated by the engine thereof, tubes connecting the suction and discharge of the pump to upper and lower ends of the cylinders, pistons having orifices therein positioned in the cylinders between the connections of the tubes thereto whereby the cylinders function as shock absorbers, a valve assembly adapted to be mounted on the chassis and through which said tubes are connected, a valve actuator positioned on one end of the valve assembly, solenoids in the valve actuator and positioned to operate said actuator to adjust the valve element of the valve assembly, means for completing circuits to the solenoids upon rotation of the steering wheel of the vehicle, a velocity compensator mounted in the chassis for controlling the valve actuator, resilient means for urging the valve compensator into engagement with the valve actuator, said valve compensator limiting movement of the valve actuator, a governor for adjusting the position of the valve compensator and means actuated by a turning movement of the steering wheel of the vehicle for controlling the movement of the velocity compensator.

References Cited in the file of this patent

FOREIGN PATENTS 521,741    Great Britain _____ May 30, 1940